(12) United States Patent
Nagatsuka et al.

(10) Patent No.: US 9,352,747 B2
(45) Date of Patent: May 31, 2016

(54) VEHICLE TRAVEL CONTROL SYSTEM

(71) Applicant: Hitachi Automotive Systems, Ltd., Hitachinaka-shi, Ibaraki (JP)

(72) Inventors: Keiichiro Nagatsuka, Hitachinaka (JP); Makoto Yamakado, Tokyo (JP); Mitsuhide Sasaki, Hitachinaka (JP); Mikio Ueyama, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/379,686

(22) PCT Filed: Jan. 21, 2013

(86) PCT No.: PCT/JP2013/051026
§ 371 (c)(1),
(2) Date: Aug. 19, 2014

(87) PCT Pub. No.: WO2013/145817
PCT Pub. Date: Oct. 3, 2013

(65) Prior Publication Data
US 2015/0298696 A1    Oct. 22, 2015

(30) Foreign Application Priority Data
Mar. 28, 2012   (JP) ................... 2012-074364

(51) Int. Cl.
*G06F 7/70*      (2006.01)
*B60Q 1/44*      (2006.01)
(Continued)

(52) U.S. Cl.
CPC  *B60W 30/14* (2013.01); *B60T 7/12* (2013.01); *B60T 7/22* (2013.01); *B60T 8/171* (2013.01);
(Continued)

(58) Field of Classification Search
USPC .................... 701/70, 301; 340/479
See application file for complete search history.

(56) References Cited

U.S. PATENT DOCUMENTS 6,421,790 B1 * 7/2002 Fruehling ........... G06F 11/1004
                                                                 714/30
6,442,484 B1 * 8/2002 Miller ................. B60R 21/0134
                                                                 340/990
(Continued)

FOREIGN PATENT DOCUMENTS

JP    11-39586 A    2/1999
JP    11-99923 A    4/1999
(Continued)

OTHER PUBLICATIONS

Yamakado, M. et al., "An experimentally confirmed driver longitudinal acceleration control model combined with vehicle lateral motion," Vehicle System Dynamics, 2008, pp. 129-149, vol. 46, Supplement, Taylor & Francis.

(Continued)

*Primary Examiner* — Thomas G Black
*Assistant Examiner* — Tyler Paige
(74) *Attorney, Agent, or Firm* — Crowell & Moring LLP

(57) ABSTRACT

A vehicle travel control system includes a first unit configured to calculate a target longitudinal acceleration/deceleration control command of the own vehicle based on a distance or a relative speed between the own vehicle and a forward obstacle, traveling route information from a vehicle navigation system or a Global Positioning System, and input information such as a vehicle speed set by a driver; a second unit configured to calculate a target longitudinal acceleration/deceleration control command according to a lateral jerk that acts on the own vehicle; and an arbitration unit configured to perform, based on the target longitudinal acceleration/deceleration control command calculated by the second unit, arbitration of the target longitudinal acceleration/deceleration control command calculated by the first unit, wherein output from the arbitration unit is set as a command to control the target longitudinal acceleration/deceleration control command of the own vehicle.

7 Claims, 6 Drawing Sheets

(51) Int. Cl.

| | | |
|---|---|---|
| *B60W 30/14* | (2006.01) | |
| *B60T 7/22* | (2006.01) | |
| *B60T 13/66* | (2006.01) | |
| *B60W 30/02* | (2012.01) | |
| *B60W 30/16* | (2012.01) | |
| *B60W 40/107* | (2012.01) | |
| *B60T 7/12* | (2006.01) | |
| *B60T 8/171* | (2006.01) | |
| *B60W 10/04* | (2006.01) | |
| *B60W 10/18* | (2012.01) | |
| *B60W 30/08* | (2012.01) | |
| *B60W 40/02* | (2006.01) | |
| *G01C 21/26* | (2006.01) | |
| *G01S 19/13* | (2010.01) | |
| *B60W 50/00* | (2006.01) | |

(52) U.S. Cl.
CPC .............. *B60T 13/662* (2013.01); *B60W 10/04* (2013.01); *B60W 10/18* (2013.01); *B60W 30/02* (2013.01); *B60W 30/08* (2013.01); *B60W 30/143* (2013.01); *B60W 30/16* (2013.01); *B60W 40/02* (2013.01); *B60W 40/107* (2013.01); *G01C 21/26* (2013.01); *G01S 19/13* (2013.01); *B60T 2201/02* (2013.01); *B60T 2210/36* (2013.01); *B60W 2050/0024* (2013.01); *B60W 2520/10* (2013.01); *B60W 2520/125* (2013.01); *B60W 2550/308* (2013.01); *B60W 2550/402* (2013.01); *B60W 2720/10* (2013.01); *B60W 2720/125* (2013.01)

(56) References Cited

U.S. PATENT DOCUMENTS

| | | | | |
|---|---|---|---|---|
| 8,175,796 | B1* | 5/2012 | Blackburn | G08G 1/161 340/902 |
| 2002/0105423 | A1* | 8/2002 | Rast | G08G 1/162 340/479 |
| 2003/0130783 | A1* | 7/2003 | Hellmann | B60K 31/0008 701/93 |
| 2007/0004553 | A1* | 1/2007 | Oikawa | B60W 30/20 477/97 |
| 2010/0030426 | A1* | 2/2010 | Okita | B60T 7/22 701/41 |
| 2010/0194593 | A1* | 8/2010 | Mays | B60Q 5/006 340/905 |
| 2010/0198491 | A1* | 8/2010 | Mays | B60W 30/09 701/124 |
| 2011/0098886 | A1* | 4/2011 | Deng | B60W 10/04 701/41 |
| 2011/0196579 | A1 | 8/2011 | Tokimasa et al. | |
| 2012/0078466 | A1* | 3/2012 | Natori | B60Q 1/52 701/36 |
| 2012/0203438 | A1* | 8/2012 | Breuer | B60T 7/22 701/70 |
| 2012/0290184 | A1* | 11/2012 | Suzuki | G08G 1/165 701/93 |
| 2013/0219039 | A1* | 8/2013 | Ricci | G06F 3/0484 709/223 |

FOREIGN PATENT DOCUMENTS

| | | |
|---|---|---|
| JP | 2000-95130 A | 4/2000 |
| JP | 2008-296628 A | 12/2008 |
| JP | 2008-296887 A | 12/2008 |
| JP | 2009-149137 A | 7/2009 |
| JP | 2010-247617 A | 11/2010 |
| JP | 2011-73534 A | 4/2011 |
| JP | 2011-157067 A | 8/2011 |
| JP | 2011-162004 A | 8/2011 |
| JP | 2012-30665 A | 2/2012 |

OTHER PUBLICATIONS

Takahashi, Junya et al., "A hybrid stability-control system: combining direct-yaw-moment control and G-Vectoring Control," Vehicle System Dynamics, 2012, pp. 1-13, iFirst, Taylor & Francis.

International Search Report dated May 7, 2013 with English translation thereof {Four (4) pages}.

* cited by examiner

VEHICLE TRAVEL CONTROL SYSTEM

TECHNICAL FIELD

The present invention relates to a vehicle travel control system which includes adaptive cruise control, pre-crash control, or the like.

BACKGROUND ART

Recently, interest in a safety technique for an automobile has increased greatly. Thus, various preventive safety systems have been put to practical use mainly by an automobile related company and the like. Among these preventive safety systems, a system which uses Adaptive Cruise Control (hereinafter, referred to as "ACC") or pre-crash control is widely known.

The ACC controls a vehicle traveling speed to a pre-set vehicle speed without an operation intervention by a driver or controls a distance between an own vehicle and a vehicle traveling ahead thereof to a predetermined distance (see, e.g., PTL 1).

Also, the pre-crash control is control to reduce impact of a collision by activating a brake or to reduce impact of a collision on an occupant by appropriately tightening a seat belt when it is not possible to avoid a collision with a target getting closer to an own vehicle from the front, side, or behind thereof (see, e.g., PTL 2).

Generally, control algorithm such as what has been described above is incorporated into a microcontroller or the like. A vehicle travel control system is realized by the following system configuration. That is, by calculating a control command such as acceleration, which is requested to the vehicle according to each kind of control algorithm, and by transmitting a command to a brake actuator, breaking of a vehicle is performed and by transmitting a command to a throttle actuator, driving of the vehicle is performed.

Here, a plurality of kinds of control algorithm is often incorporated into the microcontroller or the like. Thus, it is important to determine a control command from which control algorithm is employed to control a vehicle according to a condition.

For example, in a vehicle in which two kinds of control algorithm, which are the ACC and the pre-crash control, are mounted, when pre-crash control is started during the execution of the ACC, it is considered that a priority is given to a command of the pre-crash control having higher urgency.

However, when the above described condition is a case where a vehicle-to-vehicle distance suddenly becomes short due to sudden breaking of a preceding vehicle during preceding vehicle follow-up traveling control by the ACC, it can be assumed that acceleration is controlled in a deceleration direction by the ACC before determination to start the pre-crash control is made. In this case, when a control command is simply switched to a value calculated by the pre-crash control along with the determination to start the pre-crash control, it may be considered that breaking force is rather weakened depending on setting for calculating a control command in each kind of control algorithm.

As a method to solve such a problem, PTL 3 discloses a vehicle control system including: a distance detection unit configured to detect a distance between an own vehicle and a forward obstacle, which includes a preceding vehicle, in a predetermined range forward in a traveling direction of the own vehicle; a relative speed detection unit configured to detect a relative speed between the own vehicle and the obstacle; a first target acceleration calculation unit configured to calculate first target acceleration for keeping a set vehicle-to-vehicle distance based on a distance and a relative speed with the preceding vehicle in such a manner that follow-up traveling is performed with the set vehicle-to-vehicle distance away from the preceding vehicle traveling a traveling lane of the own vehicle; a second target acceleration calculation unit configured to calculate second target acceleration for decelerating the own vehicle when it is determined that the own vehicle may collides with the forward obstacle based on a distance and a relative speed with the forward obstacle; a third target acceleration calculation unit configured to calculate third target acceleration which is at least equal to or smaller than smaller one of the first and second target acceleration based on the first target acceleration and the second target acceleration when the second target acceleration is calculated by the second target acceleration calculation unit while the first target acceleration is calculated by the first target acceleration calculation unit; and a control unit configured to control a speed adjustment member including a brake system provided to the own vehicle in such a manner that acceleration of the own vehicle matches the third target acceleration when the third target acceleration is calculated by the third target acceleration calculation unit.

Also, other than these, a system to control a vehicle safely and comfortably similarly to a skilled driver by controlling a target longitudinal acceleration/deceleration control command according to a lateral jerk generated in response to a driver operation has been proposed (see, e.g., PTL 1 and PTL 2).

CITATION LIST

Patent Literatures

PTL 1: JP 11-39586 A
PTL 2: JP 2000-95130 A
PTL 3: JP 2008-296887 A

Non-Patent Literature

NPL 1: M. Yamakado, et al., An experimentally confirmed driver longitudinal acceleration control model combined with vehicle lateral motion, Vehicle System Dynamics, Vol. 46, Supplement, pp. 129-149, Taylor & Francis, 2008
NPL 2: J. Takahashi, et al., An hybrid stability-control system: combining direct-yaw-moment control and G-Vectoring Control, Vehicle System Dynamics, pp. 1-13, iFirst, Taylor & Francis, 2012

SUMMARY OF INVENTION

Technical Problem

However, in the described method, only strength of a target longitudinal acceleration/deceleration control command of a vehicle is considered and a condition in which a lateral motion of a vehicle is generated by curved road traveling, a lane change, avoidance behavior by a steering operation of a driver, or the like is not considered. Thus, vehicle behavior may be destabilized by applying a control command and it is difficult to say that reliability or safety as a system is secured adequately.

To solve the described problem, a purpose of the present invention is to provide a vehicle travel control system which is capable of controlling a vehicle while keeping vehicle behavior stable by calculating a suitable command from control commands, which are calculated by a plurality of kinds of control algorithm, while considering a lateral motion of an own vehicle and not making a driver feel discomfort.

Solution to Problem

To solve the described problem, a vehicle travel control system according to the present invention includes: a first unit configured to calculate a target longitudinal acceleration/deceleration control command of an own vehicle based on input information; a second unit configured to calculate a target longitudinal acceleration/deceleration control command according to a lateral jerk which acts on the own vehicle; and an arbitration unit configured to perform, based on the target longitudinal acceleration/deceleration control command calculated by the second unit, arbitration of the target longitudinal acceleration/deceleration control command calculated by the first unit, wherein output from the arbitration unit is set as a command to control the target longitudinal acceleration/deceleration control command of the own vehicle.

The input information is a distance or a relative speed between the own vehicle and a forward obstacle, traveling route information from a vehicle navigation system or a Global Positioning System, or a vehicle speed set by a driver of the own vehicle and the first unit is configured to calculate a target longitudinal acceleration/deceleration control command with the vehicle speed as a target speed in such a manner that the vehicle speed is kept.

Also, the arbitration unit is configured to calculate an acceleration period, a deceleration period, or a steady period based on the target longitudinal acceleration/deceleration control command calculated by the second unit and to perform arbitration according to the period.

Furthermore, a unit configured to switch a control gain which is for the target longitudinal acceleration/deceleration control command calculation by the second unit is included.

Advantageous Effects of Invention

According to the present invention, it is possible to provide a vehicle travel control system which is capable of performing control while keeping vehicle behavior stable by calculating a suitable command from control commands, which are calculated by a plurality of kinds of control algorithm, while considering a lateral motion of an own vehicle and not making a driver feel discomfort.

DESCRIPTION OF EMBODIMENTS

Figure 1:
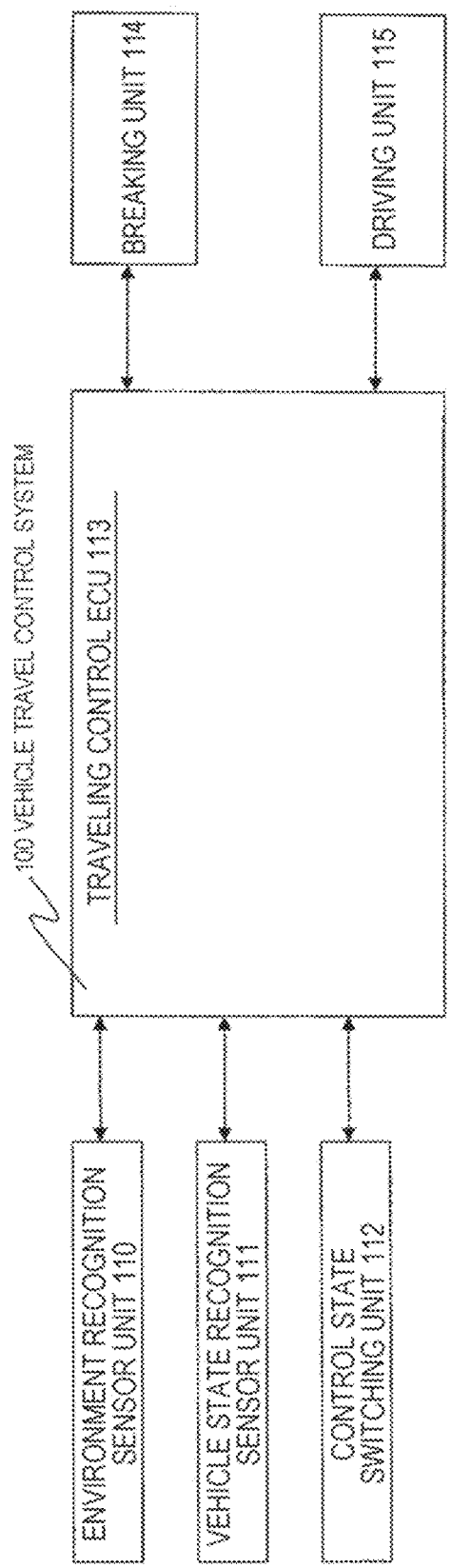
FIG. 1 is a view illustrating a schematic block configuration of a vehicle travel control system according to a first embodiment which is an embodiment of the present invention.

In the following, a vehicle travel control system according to an embodiment of the present invention will be described with reference to FIG. 1 to FIG. 6. Note that in the drawings and the following description, the same reference numbers or the same reference signs are used to the same ones.

First Embodiment

Block Configuration

FIG. 1 is a view illustrating a schematic block configuration of a vehicle travel control system of a first embodiment which is an embodiment of the present invention. In FIG. 1, the vehicle travel control system includes an environment recognition sensor unit 110, a vehicle state recognition sensor unit 111, a control state switching unit 112, a traveling control Electronic Control Unit (ECU) 113, a breaking unit 114, and a driving unit 115.

The environment recognition sensor unit 110 detects a distance, a relative speed, an angle, or the like to a preceding vehicle, a person, an object, or the like which mainly exists ahead of an own vehicle (not illustrated) and transmits the result to the traveling control ECU 113. Specifically, the environment recognition sensor unit 110 is, for example, a stereo camera, a monocular camera, a millimeter-wave radar, or a laser radar.

The vehicle state recognition sensor unit 111 includes a function to collect behavior information of a vehicle such as a speed of an own vehicle, a yaw rate, a target longitudinal acceleration/deceleration control command, or vehicle lateral acceleration and operation information of a driver such as an accelerator opening, a depressed amount of a brake, or a steering angle and to transmit the information to the traveling control ECU 113.

Note that information transmitted to the traveling control ECU 113 from the environment recognition sensor unit 110 and the vehicle state recognition sensor unit 111 only needs to be minimum information necessary for each kind of vehicle control algorithm described later. Thus, according to information necessary to be collected, a configuration such as a sensor can be added or deleted.

The control state switching unit 112 includes a function to switch a control gain (Cxy) in G-Vectoring control described later. As a specific example, by a dial switching type switch, it is made possible for a user to select a control mode such as a Normal mode or a Safety mode. A control gain set in the Safety mode is larger than a control gain set in the Normal mode.

The traveling control ECU 113 includes, for example, a ROM to store programs of a plurality of kinds of vehicle control algorithm described later, a CPU to execute various kinds of calculation processing, and a RAM to store a calculation result.

The breaking unit 114 includes a function to put a brake on a vehicle according to a braking command on the vehicle as a result of the calculation in the traveling control ECU 113. For example, a mechanism such as a pump to discharge a high-pressure brake fluid and an electromagnetic valve to supply the brake fluid to a wheel cylinder of each wheel while adjusting a pressure of the brake fluid is suitable.

The driving unit 115 drives a vehicle according to a driving instruction on the vehicle as a result of the calculation in the traveling control ECU 113. Specifically, an engine system, an electric motor system, or the like which can vary driving force of a vehicle according to a command is suitable.

Note that in the first embodiment, it is assumed that a generally used controller area network (CAN) is used as an in-vehicle network for transmission of information which network connects the environment recognition sensor unit 110, the vehicle state recognition sensor unit 111, the traveling control ECU 113, the breaking unit 114, and the driving unit 115. However, the communication unit is not the main point in the present invention and a different communication unit may be used.

<Processing Flow>

Figure 2:
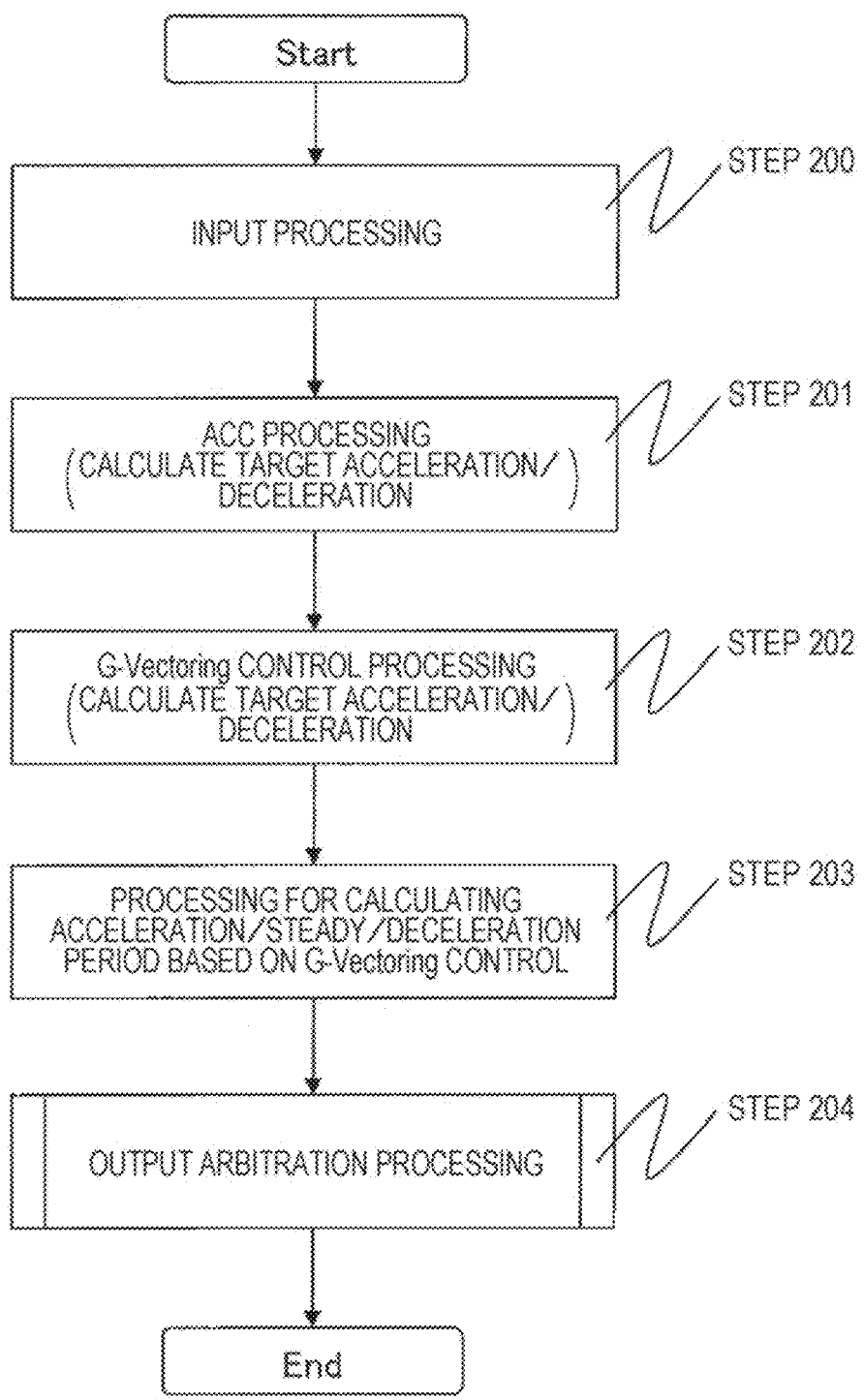
FIG. 2 is a flowchart of a routine which is executed by a traveling control ECU 113 of the vehicle travel control system according to the first embodiment and is repeated in predetermined time intervals.

Next, specific processing in the traveling control ECU 113 included in the vehicle travel control system according to the first embodiment of the present invention will be described with reference to FIG. 2. FIG. 2 is a flowchart of a routine which is executed by the traveling control ECU 113 and is repeated in predetermined time intervals.

In the following, a case in which control algorithm mounted in the traveling control ECU 113 is the ACC and the G-Vectoring control will be described.

When the routine is activated, first, input processing in step 200 is executed. Information measured by the environment recognition sensor unit 110, the vehicle state recognition sensor unit 111, and the control state switching unit 112 is received through the CAN and is converted into a data format used in a step described later. Specifically, calculation of a new physical quantity or the like is performed by physical unit conversion processing, time differentiation processing, or calculation by an already-known physical equation on an input signal.

Next, ACC processing in step 201 is executed. When a preceding vehicle is not caught or when a preceding vehicle is not within an ACC control range although the preceding vehicle is caught, an ACC command for driving in a vehicle speed set by a driver is calculated. Also, when a preceding vehicle is caught within the ACC control range, an ACC command for controlling a vehicle-to-vehicle distance (inter-vehicle time) to what is set by a driver is calculated.

Next, G-Vectoring control processing in step 202 is executed and a GVC command (Gx_GVC) is calculated by an Mathematical Formula 1.

$$\text{Gx\_GVC} = -\text{sgn}(Gy \cdot \dot{G}y)\frac{C_{xy}}{1+Ts}|\dot{G}y| \quad \text{[Mathematical Formula 1]}$$

Here, Gx_GVC: a GVC command, Gy: vehicle lateral acceleration, $\dot{G}y$: vehicle lateral jerk, Cxy: a control gain, t: a temporary lag time constant, and s: a Laplace operator.

Note that in the first embodiment, as vehicle lateral acceleration and vehicle lateral jerk used in Mathematical Formula 1, it is assumed that information input from the vehicle state recognition sensor unit 111 is used. However, information estimated, by a publicly-known vehicle model, from a steering angle and a speed of an own vehicle may be used.

Note that order of execution of step 201 and step 202 is not limited to this order and can be changed.

Next, processing for calculating an acceleration/steady/deceleration period based on the G-Vectoring control in step 203 is executed and vehicle state status (T_state) is calculated. According to the GVC command (Gx_GVC) calculated in step 202 and a vehicle state status previous value (T_state_Z1), this vehicle state status is determined by a logic illustrated in Table 1. As actual processing defined in a format such as what is illustrated in Table 1, in respect to input data described in an entry field, it is determined whether a condition is satisfied serially from the top and when the data matches the condition, processing described in an output field is executed and determination of the condition thereafter is not executed.

TABLE 1

Logic table for calculation of vehicle state status

| Input data | | Output data |
|---|---|---|
| Vehicle state status previous value (T_state_Z1) | GVC command (Gx_GVC) | Vehicle state status (T_state) |
| — | ≤Gx_th4 | Deceleration zone (T_deccel) |
| Deceleration zone (T_deccel) | ≤Gx_th3 | Deceleration zone (T_deccel) |
| — | Gx_th1≤ | Acceleration zone (T_accrl) |
| Acceleration zone (T_accrl) | Gx_th2≤ | Acceleration zone (T_accrl) |
| Deceleration zone (T_deccel) or steady zone (T_steady) | Gx_th3 < and < Gx_th1 | Steady zone (T_steady) |
| Other than what is above | | Normal zone (T_normal) |

Here, T_state: vehicle state status, Gx_GVC: a GVC command, Gx_th1: a threshold with which an acceleration zone is determined, Gx_th2: a threshold with which an acceleration zone is determined in light of hysteresis when a previous zone is an acceleration zone, Gx_th3: a threshold with which a deceleration zone is determined in light of hysteresis when a previous zone is a deceleration zone, and Gx_th4: a threshold to determine a deceleration zone. Note that a place "-" in the table indicates that the place is not used for determination of a condition. That is, here, it means that the vehicle state status previous value may be any zone.

Figure 3:
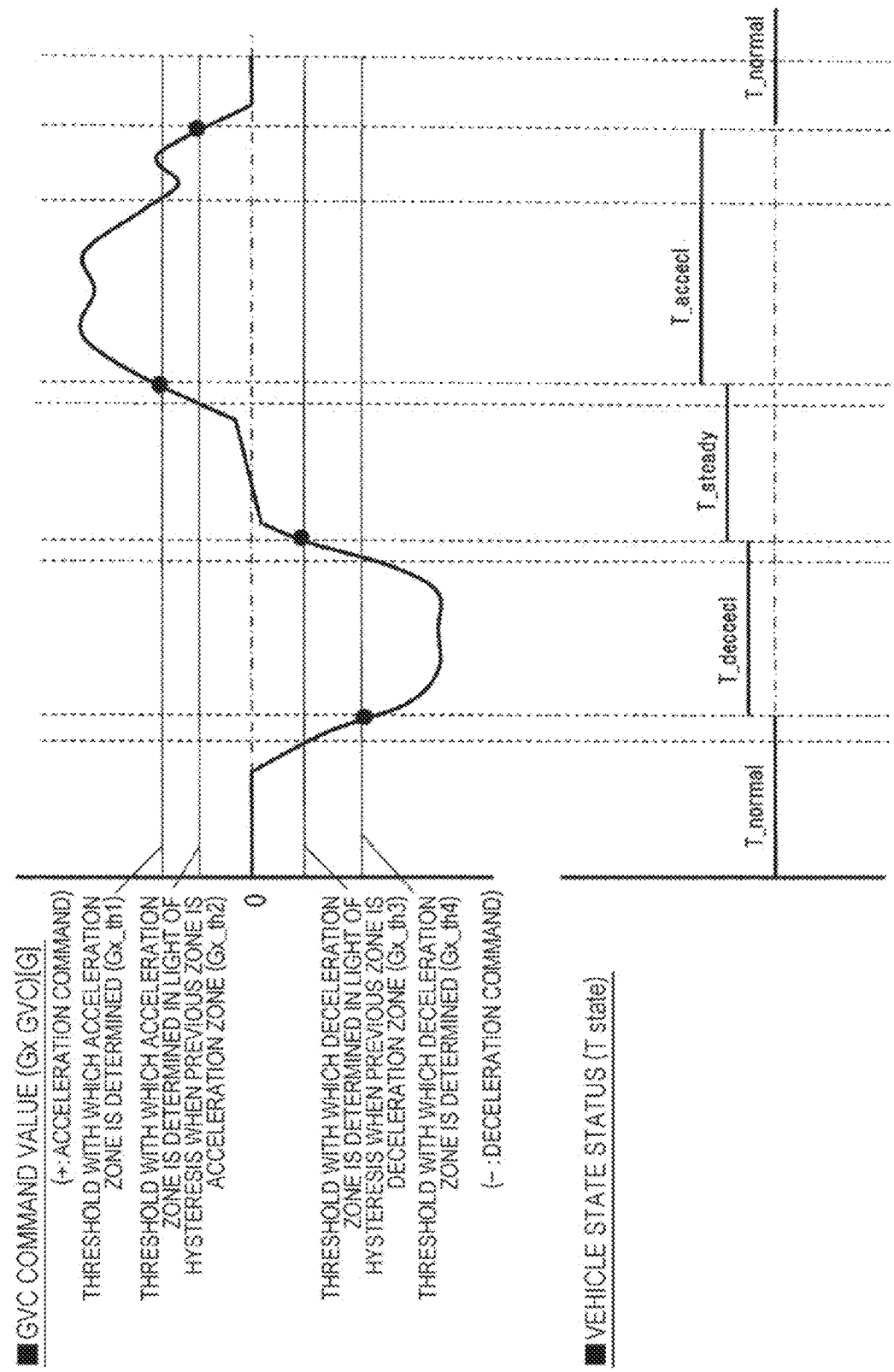
FIG. 3 is a view illustrating an example of an outline of an operation by processing for calculating an acceleration/steady/deceleration period based on G-Vectoring control in step 203 in the routine executed by the traveling control ECU 113 of the first embodiment.

FIG. 3 is a view illustrating an example of an operation outline in respect to the processing for calculating an acceleration/steady/deceleration period based on the G-Vectoring control in step 203 described above. In an upper view in FIG. 3, a horizontal axis indicates time and a vertical axis indicates a GVC command (Gx_GVC). A case in which a unit of the GVC command (Gx_GVC) is expressed in acceleration of gravity "G" is exemplified. In a case of a positive value, an acceleration control command is expressed and in a case of a negative value, a deceleration control command is expressed.

Also, in a lower view in FIG. 3, a horizontal axis indicates time and a vertical axis indicates vehicle state status. In the following, how vehicle state status is determined corresponding to the time change in the upper view in FIG. 3 will be described.

First, when the GVC command gradually decreases in a negative direction from a vicinity of zero (that is, deceleration becomes larger) and becomes smaller than the threshold with which a deceleration zone is determined (Gx_th4), it is determined that the vehicle state status has entered a deceleration period (T_deccecl). Also, it is determined that in a zone therebefore, the vehicle state status is a normal zone (T_normal).

Next, when the GVC command gradually increases in a positive direction and becomes larger than the threshold with which a deceleration zone is determined in light of hysteresis when a previous zone is a deceleration zone (Gx_th3), it is determined that the vehicle state status has become a steady zone (T_steady). Here, by setting determination thresholds of the deceleration zone and the steady zone separately, it is possible to prevent the vehicle state status from switching positions alternately (performing hunting) when the GVC command transitions in a vicinity of the determination threshold.

Next, when the GVC command exceeds the vicinity of zero and becomes a positive value from a negative value (that is, deceleration control command changes to acceleration control command) and further increases gradually in the positive direction and becomes larger than the threshold with which an acceleration zone is determined (Gx_th1), it is determined that the vehicle state status has entered an acceleration period (T_accecl).

Next, when the GVC command gradually decreases and becomes smaller than the threshold with which an acceleration zone is determined in light of hysteresis when a previous zone is an acceleration zone (Gx_th2), it is determined that the vehicle state status has returned to the normal zone (T_normal). Here, a purpose of providing the determination thresholds of the acceleration zone and the normal zone separately is to prevent the vehicle state status from switching places alternately (performing hunting), similarly to what has been described above.

Note that in the vehicle state status, it is possible to adjust a period in each state by giving a predetermined period of moratorium since each condition is satisfied.

Figure 4:
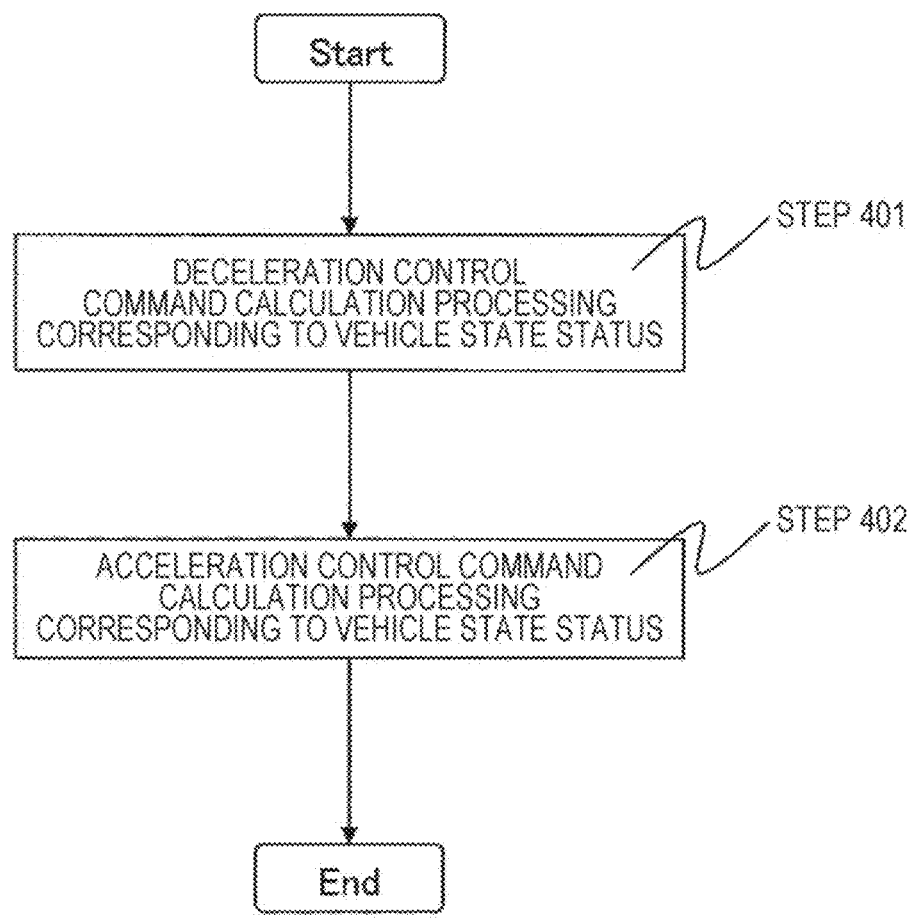
FIG. 4 is a view illustrating a flow of a routine executed in step 204 of the routine executed by the traveling control ECU 113 of the first embodiment.

Next, output arbitration processing in step 204 will be described with reference to FIG. 4. FIG. 4 is a flowchart of a routine executed in the output arbitration processing in step 204.

As described, a case in which a unit of a control command from each application is expressed in the acceleration of gravity "G" is exemplified. In a case of a positive value, an acceleration control command is expressed, and in a case of a negative value, a deceleration control command is expressed. In the following description, the control command from each application may be conveniently called an acceleration control command in a case of a positive value and called a deceleration control command in a case of a negative value.

Also, when each control command calculated in the ACC processing in step 201 or the G-Vectoring control processing in step 202 is actually used in step 401 and step 402, processing is performed with a deceleration control command as zero in a case where the control command is a positive value and conversely, processing is performed with an acceleration control command as zero in a case where the control command is a negative value.

First, deceleration control command calculation processing corresponding to the vehicle state status in step 401 is executed. According to the vehicle state status calculated in the processing for calculating an acceleration/steady/deceleration period based on the G-Vectoring control in step 203, processing such as what is illustrated in Table 2 is executed.

As described, in the first embodiment, a case where mounted applications are the ACC and the G-Vectoring control is descried. Thus, select low of a deceleration control command of each application described in Table 2 is processing to select smaller value between an ACC deceleration control command calculated in the ACC processing in step 201 and a GVC deceleration control command calculated in the G-Vectoring control processing in step 202.

Also, in a case where processing with no deceleration control command is selected, even when there is a deceleration control command from any application, the deceleration control command is not performed and is set as zero, literally. The deceleration control command calculated in such a manner is transmitted to a breaking unit.

Note that here, when an acceleration/deceleration control command is applied to a vehicle in a case where the vehicle state status is the steady zone (T_steady), vehicle behavior may be destabilized. Thus, it is possible to select processing with no deceleration control command, which is one characteristic of the first embodiment.

TABLE 2

Logic table for deceleration control command calculation processing corresponding to vehicle state status

| Input<br>Vehicle state status (T_state) | Output<br>Deceleration control command |
|---|---|
| Normal zone (T_normal) | Select low of deceleration control command of each application |
| Deceleration zone (T_deccel) | Select low of deceleration control command of each application |
| Acceleration zone (T_accrl) | Select low of deceleration control command of each application |
| Steady zone (T_steady) | No deceleration control command |

Next, acceleration control command calculation processing corresponding to the vehicle state status in step 402 is executed. According to the vehicle state status calculated in the processing for calculating an acceleration/steady/deceleration period based on the G-Vectoring control in step 203 and the deceleration control command calculated in the deceleration control command calculation processing corresponding to the vehicle state status in step 401, processing such as what is illustrated in Table 3 is executed.

Select high of an acceleration control command of each application described in Table 3 is processing to select a larger value between an ACC acceleration control command calculated in the ACC processing in step 201 and a GVC acceleration control command calculated in the G-Vectoring control processing in step 202.

Here, when select high processing is executed according to the vehicle state status and the deceleration control command calculated in step 401, it is possible to further add limit processing to the GVC acceleration control command calculated in the G-Vectoring control processing in step 202. In this case, it is possible to control an acceleration control command which is needlessly large in respect to a condition of a lateral motion of a vehicle and to execute acceleration processing while stabilizing behavior.

Also, in a case where processing with no acceleration control command is selected, even when there is an acceleration control command from any application, the acceleration control command is not performed and is set as zero, literally. The acceleration control command calculated in such a manner is transmitted to a driving unit.

TABLE 3

Logic Table for acceleration control command calculation processing corresponding to vehicle state status

| Input | | Output |
|---|---|---|
| Vehicle state status (T_state) | Deceleration control command | Acceleration control command |
| Normal zone (T_normal) | Present | No acceleration control command |
| | Absent (zero) | Select high of acceleration control command of each application |
| Deceleration zone (T_deccel) | Present | No acceleration control command |
| | Absent (zero) | No acceleration control command |
| Acceleration zone (T_accrl) | Present | No acceleration control command |
| | Absent (zero) | Select high of acceleration control command of each application |
| Steady zone (T_steady) | Present | No acceleration control command |
| | Absent (zero) | No acceleration control command |

<Example of Specific Traveling Scene>

Figure 5:
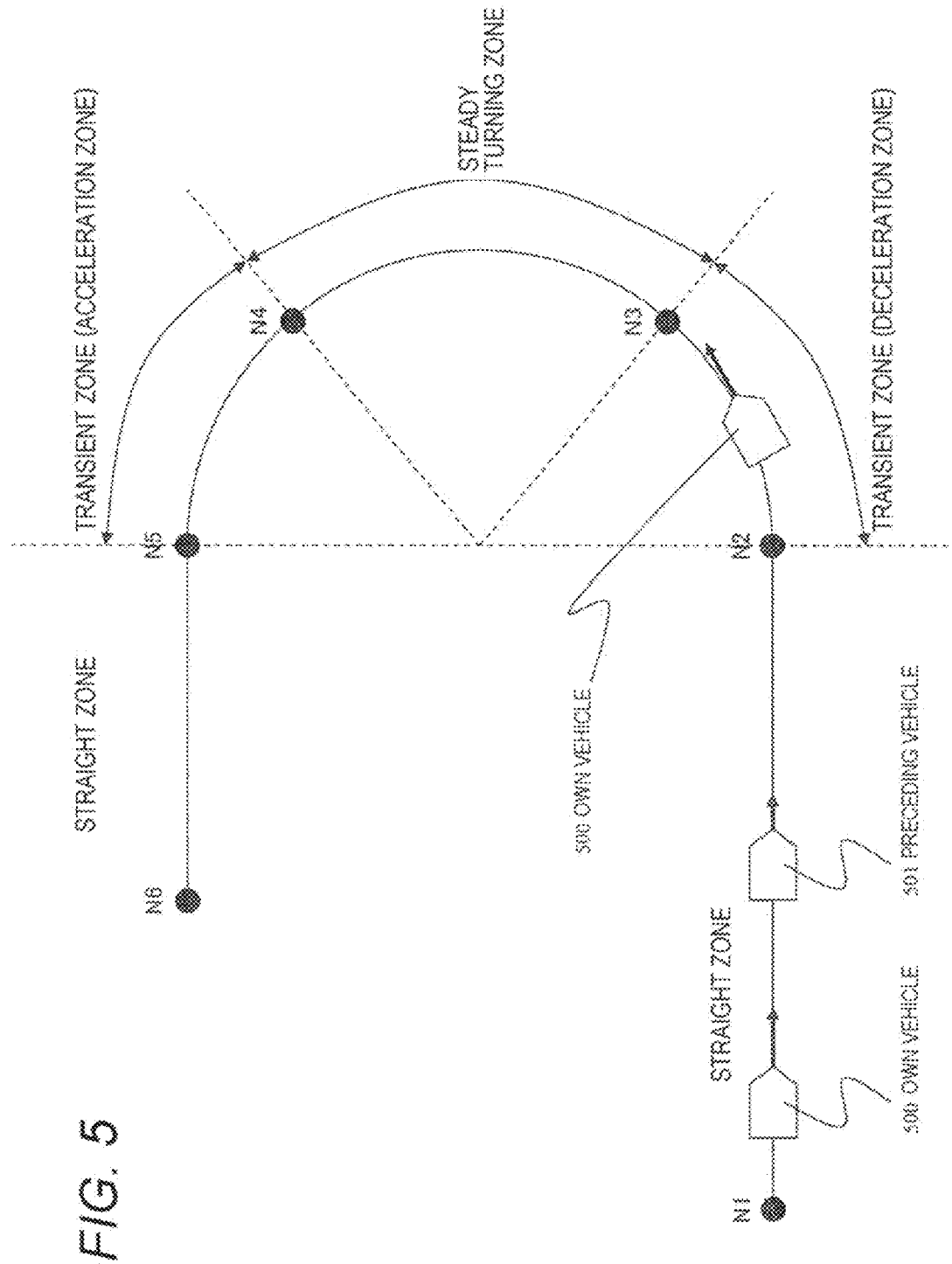
FIG. 5 is a schematic view illustrating a traveling road of an own vehicle, in which the vehicle travel control system according to the first embodiment is mounted, from entering a curve until getting out of the curve.

FIG. 5 is a schematic view illustrating a traveling road of an own vehicle, in which the vehicle travel control system according to the first embodiment is mounted, from entering a curve until getting out of the curve. In FIG. 5, it is assumed that the traveling road includes a straight zone (N1 to N2), a transient zone (N2 to N3) including a relaxation curve, a steady turning zone (N3 to N4), a transient zone (N4 to N5) including a relaxation curve, and a straight zone (N5 to N6).

Also, in FIG. 5, the following scene is assumed. That is, in the straight zone (N1 to N2), after an own vehicle 500 traveling at a set vehicle speed by the ACC catches up with a preceding vehicle 501 traveling at a speed lower than the set vehicle speed and performs follow-up traveling for a certain period of time, the preceding vehicle deviates from an own lane due to a lane change or the like and the own vehicle 500 accelerates to the set vehicle speed again. A traveling scenario in which the own vehicle 500 keeps traveling and enters a curved road (N2 to N5), and then, travels a straight road (N5 to N6) again will be described as an example.

Figure 6:
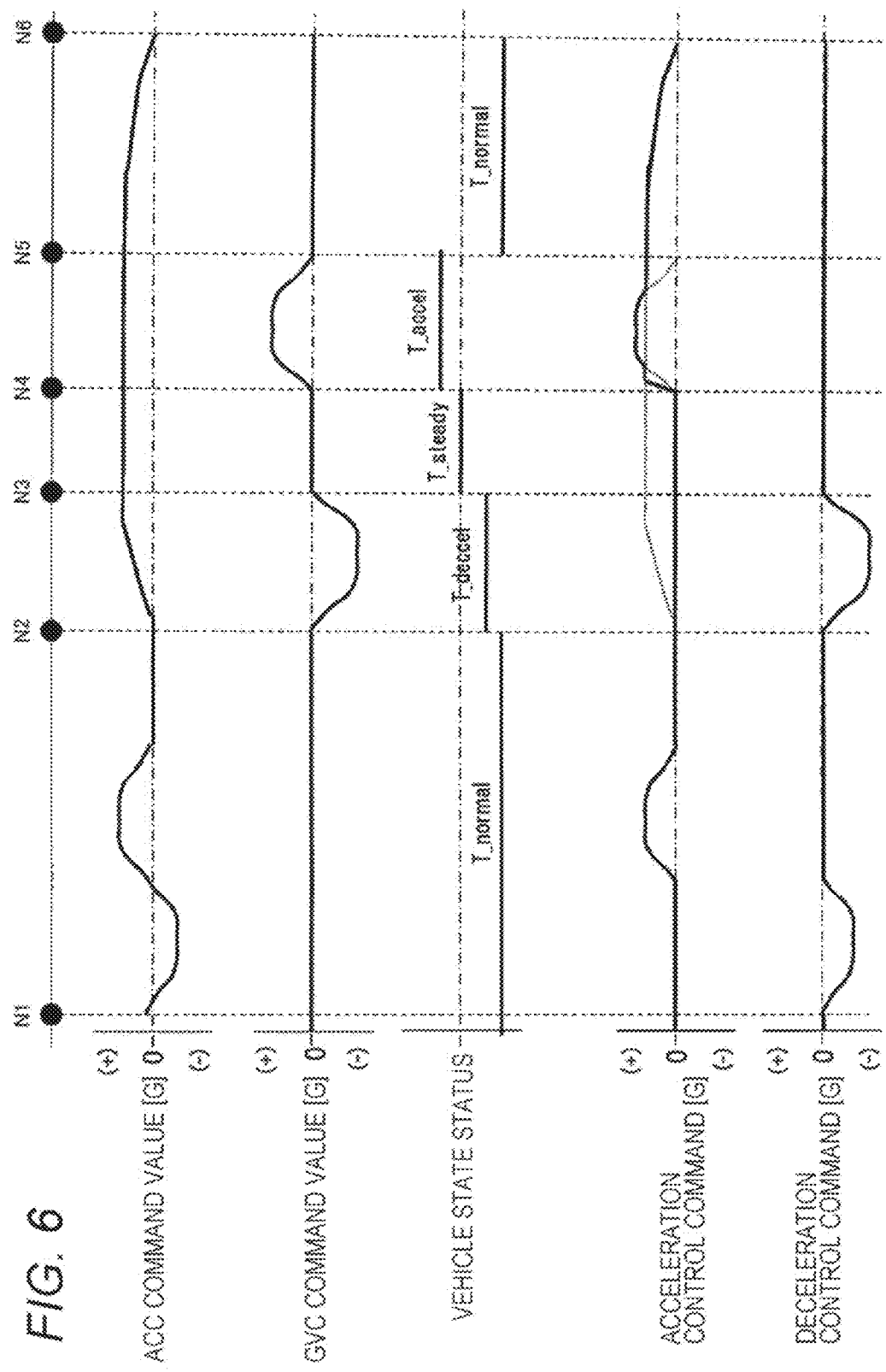
FIG. 6 is a view illustrating a time series waveform of each of an ACC command, a GVC command, vehicle state status, an acceleration control command, and a deceleration control command of when the own vehicle travels according to a traveling scenario in FIG. 5.

Next, FIG. 6 is a view illustrating a time series waveform of each of the ACC command, the GVC command, the vehicle state status, the acceleration control command, and the deceleration control command of when traveling is performed according to the described traveling scenario.

First, in the straight zone (N1 to N2), a driver keeps a steering angle constant in order to make the own vehicle travel straight. Thus, vehicle lateral acceleration which acts on the own vehicle becomes constant in the vicinity of zero, and thus, the GVC command becomes zero. Also, as described, in this zone, since the own vehicle 500 driving at the set vehicle speed by the ACC catches up with the preceding vehicle 501 traveling at a speed lower than the set vehicle speed and enters an ACC control range, a negative ACC command is calculated to perform control to a vehicle-to-vehicle distance or an inter-vehicle time set by the driver in advance. When the preceding vehicle deviates from an own lane due to a lane change or the like after the follow-up traveling in this state is performed for a certain period of time, a positive ACC command is calculated for acceleration to the set vehicle speed.

On the other hand, since it is determined that the vehicle state status in this zone is a normal zone, as the deceleration control command, select low of a command of each application is output and as the acceleration control command, select high of a command of each application is output in a case of no deceleration control command. Here, as described, the GVC command is zero. Thus, as a result, the ACC command is output as it is.

Next, when the own vehicle enters the transient zone (N2 to N3), the driver starts a steering operation gradually and starts increasing the steering. In response to this driver operation, vehicle lateral acceleration which acts on the own vehicle also increases gradually. Thus, since a lateral jerk increases, a command in the deceleration direction is calculated as the GVC command. Here, as the ACC command, to compensate the speed of the own vehicle decelerated by the GVC command, a command in the acceleration direction is gradually calculated. On the other hand, since the vehicle state status in this zone becomes the deceleration zone, the acceleration control command becomes absent (zero) and as the deceleration control command, select low of a command of each application is output. In the vehicle behavior here, while a load moves to front wheels due to the deceleration and cornering stiffness of the front wheels is improved, a load on rear wheels is decreased and cornering stiffness of the rear wheels is decreased. According to these effects, maneuverability can be improved. This is a characteristic effect of entry into a corner by the G-Vectoring control, but a similar effect can be acquired even when a plurality of kinds of control algorithm is combined.

Subsequently, when the own vehicle enters a steady zone (N3 to N4), the driver stops increasing the steering and keeps the steering angle constant. Here, since the vehicle lateral acceleration which acts on the own vehicle becomes constant, the GVC command becomes zero. Here, as the ACC command, to compensate the speed of the own vehicle decelerated by the GVC command, the command in the acceleration direction is continuously calculated.

On the other hand, since the vehicle state status in this zone becomes the steady zone, the acceleration control command and the deceleration control command become absent (zero). In the vehicle behavior here, as described, since the driver keeps steering in such a manner that the steering angle becomes constant and makes the vehicle balance in such a manner as to trace a target route, the vehicle may be destabilized when an acceleration or deceleration control command by the control algorithm is applied. Thus, in this steady zone in the first embodiment, both of the acceleration and deceleration are not performed.

Subsequently, when the own vehicle enters the transient zone (N4 to N5), the driver starts returning the steering. In response to this driver operation, the vehicle lateral acceleration which acts on the own vehicle 500 gradually decreases. Here, as the GVC command, a command in the acceleration direction is calculated. Here, as the ACC command, to compensate the speed of the own vehicle decelerated by the GVC command, the command in the acceleration direction is continuously calculated.

On the other hand, since the vehicle state status in this zone becomes the acceleration zone, as the deceleration control command, select low of a command of each application is output and as the acceleration control command, select high of a command of each application is output since the deceleration control command becomes absent. In respect to the vehicle behavior here, a load moves to the rear wheels due to the acceleration and the cornering stiffness of the rear wheels is increased, and thus, the vehicle behavior is stabilized.

Note that here, especially when the acceleration control command is output with a command of each application being select high, acceleration may be performed suddenly and a driver may feel discomfort. Thus, it is preferable to add processing to moderate the sudden change of a command, which processing is, for example, general low-pass filter processing or making a command increase in a certain ratio.

Then, when the own vehicle 500 enters the straight zone (N5 to N6), the driver stops the steering operation and keeps a steering angle constant to keep the vehicle travel straight. Thus, the vehicle lateral acceleration which acts on the own vehicle 500 becomes constant, and thus, the GVC command returns to zero again. Here, as the ACC command, an acceleration control command is calculated to perform traveling at a pre-set vehicle speed.

On the other hand, since the vehicle state status in this zone becomes the normal zone, as the deceleration control command, select low of a command of each application is output and as the acceleration control command, select high of a command of each application is output since the deceleration control command becomes absent. Here, as described, the GVC command is zero. Thus, as a result, the ACC command is output as it is.

In the first embodiment, arbitration of the deceleration or acceleration control command of each application is performed in such a manner described above.

In the above, the arbitration in a case of the ACC and the G-Vectoring control has been described. However, in respect to control algorithm to be an object, a similar effect can also be acquired by adding or replacing with control algorithm, which gives an acceleration/deceleration control command in a longitudinal direction, such as pre-crash control.

Second Embodiment

A vehicle travel control system of a second embodiment according to the present invention will be described. Since there are many similar points between the second embodiment and the described first embodiment, deceleration control command calculation processing corresponding to vehicle state status in step 401 which is a main difference will be described in the following.

In the second embodiment, in the deceleration control command calculation processing corresponding to vehicle state status in step 401, processing illustrated in Table 4 is executed according to vehicle state status calculated in the processing for calculating an acceleration/steady/deceleration period based on the G-Vectoring control in step 203. A specific difference with Table 2 in the first embodiment is a point that processing in a steady zone is select low of a deceleration control command of each application. In the steady zone, both acceleration and deceleration are not preferably performed on a vehicle. However, actually, since a command from control algorithm, which has high urgency, such as pre-crash may be executed, a method to employ the strongest deceleration control command is employed.

In the second embodiment, arbitration of the deceleration or acceleration control command of each application is performed in such a manner described above.

TABLE 4

Logic table for deceleration control command calculation processing corresponding to vehicle state status

| Input<br>Vehicle state status (T_state) | Output<br>Deceleration control command |
|---|---|
| Normal zone (T_normal) | Select low of deceleration control command of each application |
| Deceleration zone (T_deccel) | Select low of deceleration control command of each application |
| Acceleration zone (T_accrl) | Select low of deceleration control command of each application |
| Steady zone (T_steady) | Select low of deceleration control command of each application |

Third Embodiment

A vehicle travel control system of a third embodiment according to the present invention will be described. Since there are many similar points between the third embodiment and the described first embodiment, acceleration control command calculation processing corresponding to vehicle state status in step 402 which is a main difference will be described in the following.

In the third embodiment, in the acceleration control command calculation processing corresponding to vehicle state status in step 402, processing illustrated in Table 5 is executed according to vehicle state status calculated in the processing for calculating an acceleration/steady/deceleration period based on the G-Vectoring control in step 203 and a deceleration control command calculated in the deceleration control command calculation processing in step 401.

A specific difference is a point that processing in an acceleration zone is select low of an acceleration control command of each application. In the acceleration zone, it is preferable to execute acceleration requested by each application as soon as possible. However, when sudden acceleration is performed by select high, vehicle behavior may be destabilized. Thus, select low is selected to prevent the destabilization.

In the third embodiment, arbitration of the deceleration or acceleration control command of each application is performed in such a manner described above.

TABLE 5

Logic table for acceleration control command calculation processing corresponding to vehicle state status

| Input | | Output |
|---|---|---|
| Vehicle state status (T_state) | Deceleration control command | Acceleration control command |
| Normal zone (T_normal) | Present | No acceleration control command |
| | Absent (zero) | Select high of acceleration control command of each application |
| Deceleration zone (T_deccel) | Present | No acceleration control command |
| | Absent (zero) | No acceleration control command |

TABLE 5-continued

Logic table for acceleration control command calculation processing corresponding to vehicle state status

| Input | | Output |
|---|---|---|
| Vehicle state status (T_state) | Deceleration control command | Acceleration control command |
| Acceleration zone (T_accrl) | Present | No acceleration control command |
| | Absent (zero) | Select low of acceleration control command of each application |
| Steady zone (T_steady) | Present | No acceleration control command |
| | Absent (zero) | No acceleration control command |

REFERENCE SIGNS LIST

100 vehicle travel control system
110 environment recognition sensor unit
111 vehicle state recognition sensor unit
112 control state switching unit
113 traveling control ECU
114 breaking unit
115 driving unit
500 own vehicle
501 preceding vehicle

The invention claimed is:

1. A vehicle travel control system comprising:
a first unit configured to calculate a target longitudinal acceleration/deceleration control command of an own vehicle based on input information;
a second unit configured to calculate a target longitudinal acceleration/deceleration control command according to a lateral jerk which acts on the own vehicle; and
an arbitration unit configured to perform, based on the target longitudinal acceleration/deceleration control command calculated by the second unit, arbitration of the target longitudinal acceleration/deceleration control command calculated by the first unit, wherein output from the arbitration unit is set as a command to control the target longitudinal acceleration/deceleration control command of the own vehicle,
the arbitration unit calculates an acceleration period, and a deceleration period, and a steady period based on a target longitudinal acceleration/deceleration control command calculated by the second unit, and
the arbitration unit performs arbitration according to the calculated period,
arbitration is to assign different values to at least the acceleration command, and
during the steady period the acceleration command is given a value of 0.

2. The vehicle travel control system according to claim 1, wherein the input information is a distance or a relative speed between the own vehicle and a forward obstacle.

3. The vehicle travel control system according to claim 1, wherein the input information is traveling route information from a vehicle navigation system or a Global Positioning System.

4. The vehicle travel control system according to claim 1, wherein the input information is a vehicle speed set by a driver of the own vehicle, and
the first unit is configured to calculate the target longitudinal acceleration/deceleration control command with the vehicle speed as a target speed in such a manner that the vehicle speed is kept.

5. The vehicle travel control system according to claim 1, wherein the input information is a plurality of pieces of information selected from a group of a distance or a relative speed between the own vehicle and a forward obstacle, traveling route information from a vehicle navigation system or a Global Positioning System, and a vehicle speed set by a driver of the own vehicle.

6. The vehicle travel control system according to claim 1, further comprising a unit configured to switch a control gain which is for the target longitudinal acceleration/deceleration control command calculation by the second unit.

7. The vehicle travel control system according to claim 1, wherein during the steady period the deceleration command is given a value of 0.

* * * * *